Figure 1:
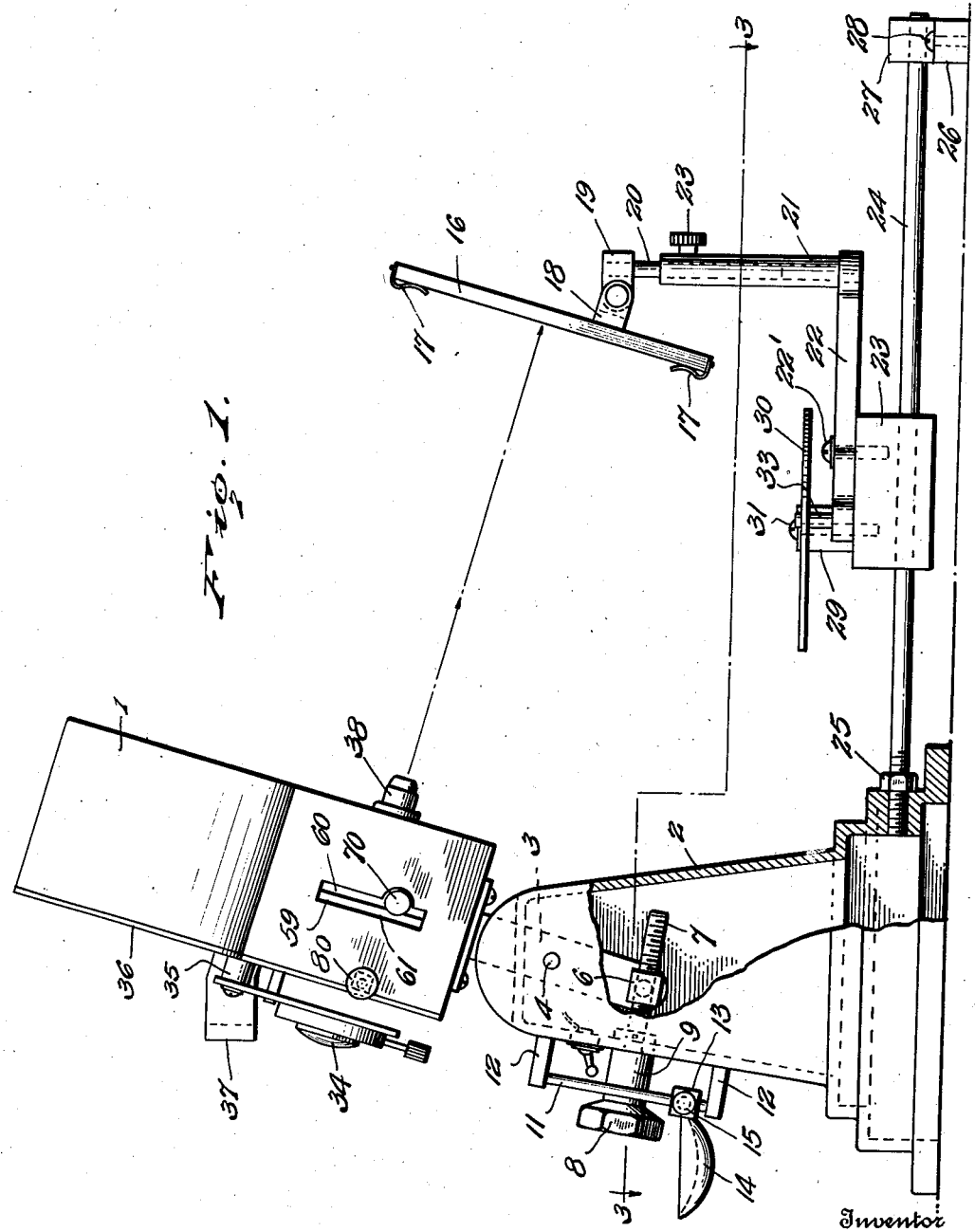

June 11, 1940.  J. L. BARNES  2,204,291
OPTICAL INSTRUMENT
Filed Oct. 28, 1937  7 Sheets-Sheet 2

Inventor
J. L. Barnes.
By Lacey & Lacey, Attorneys

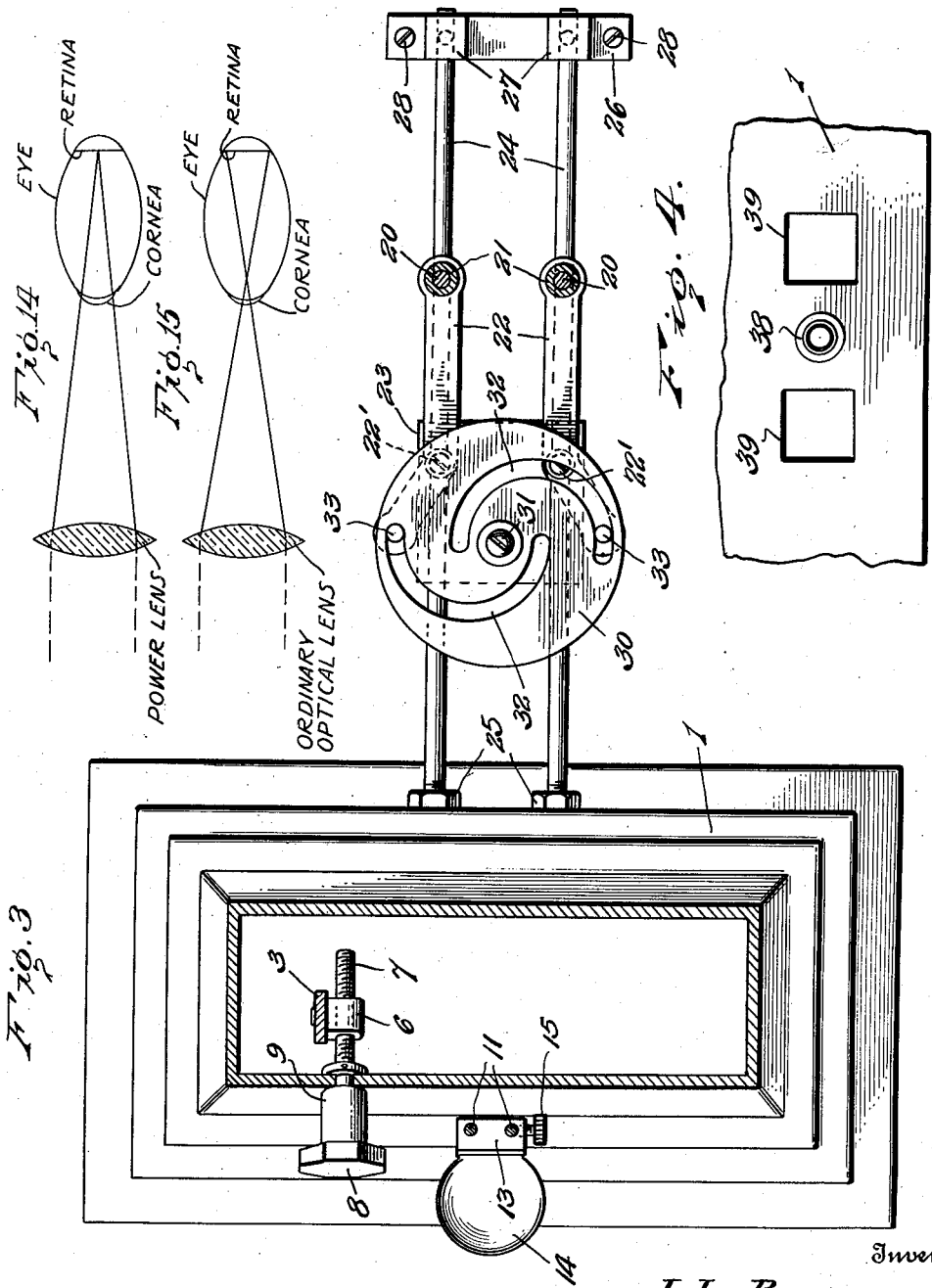

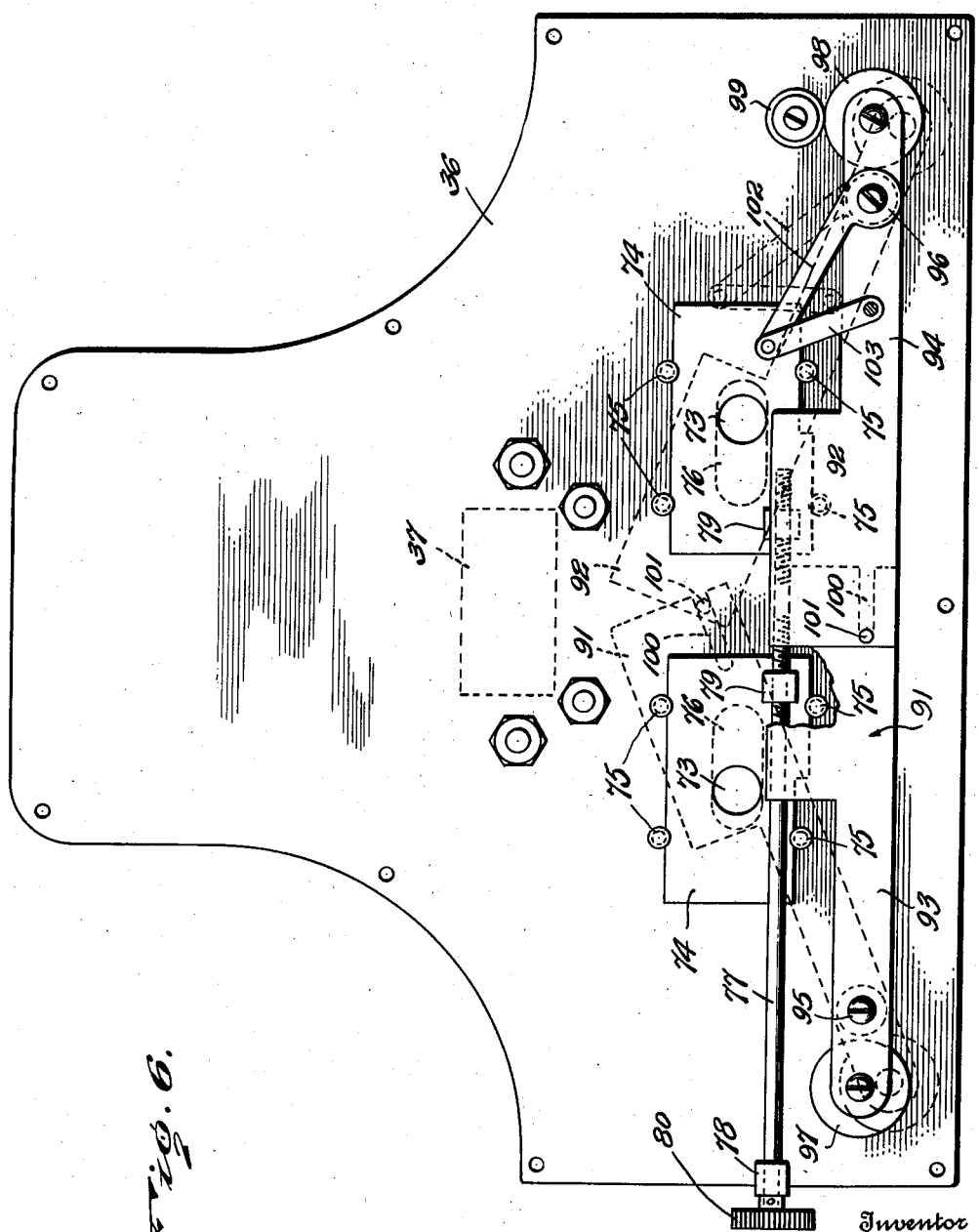

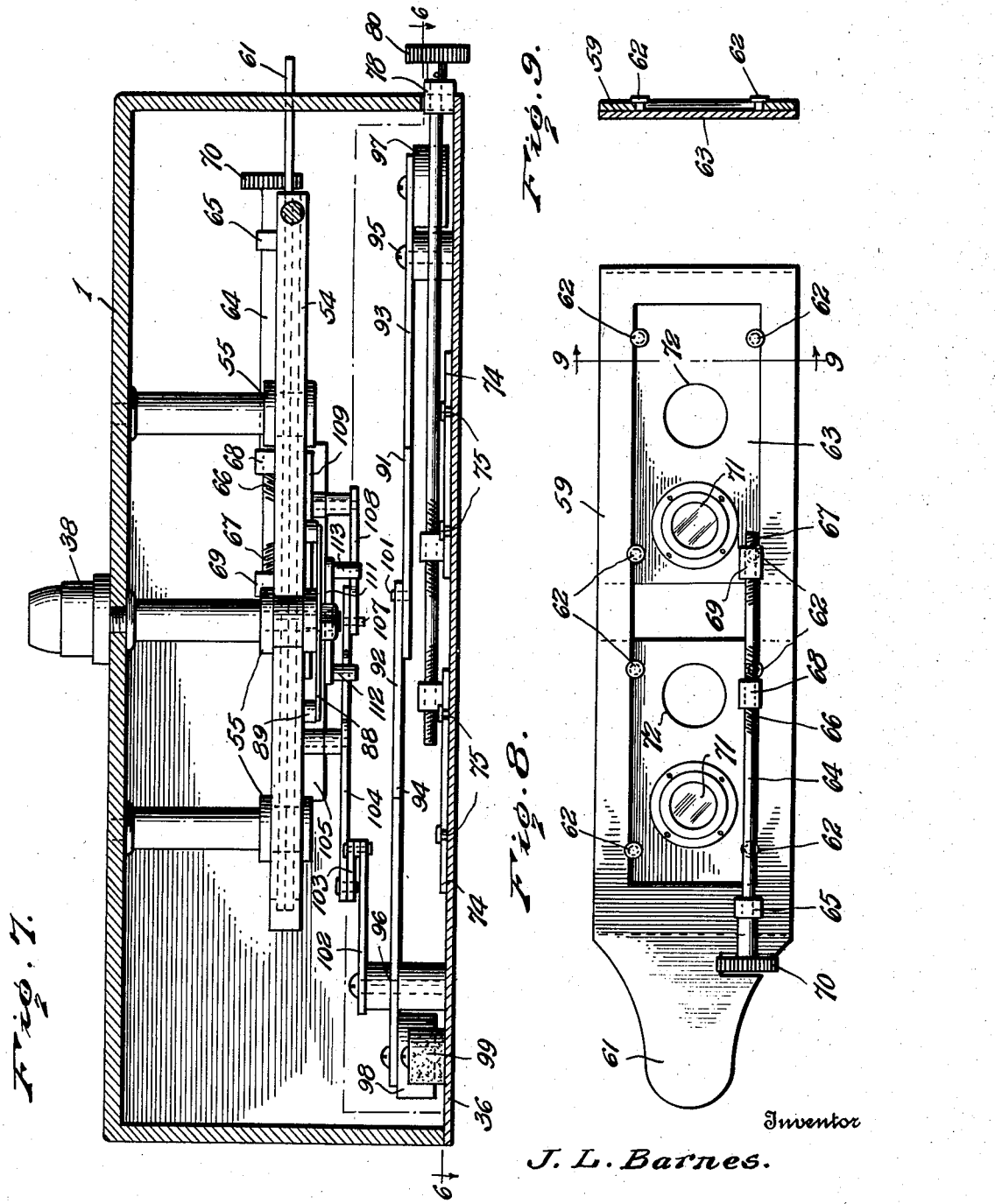

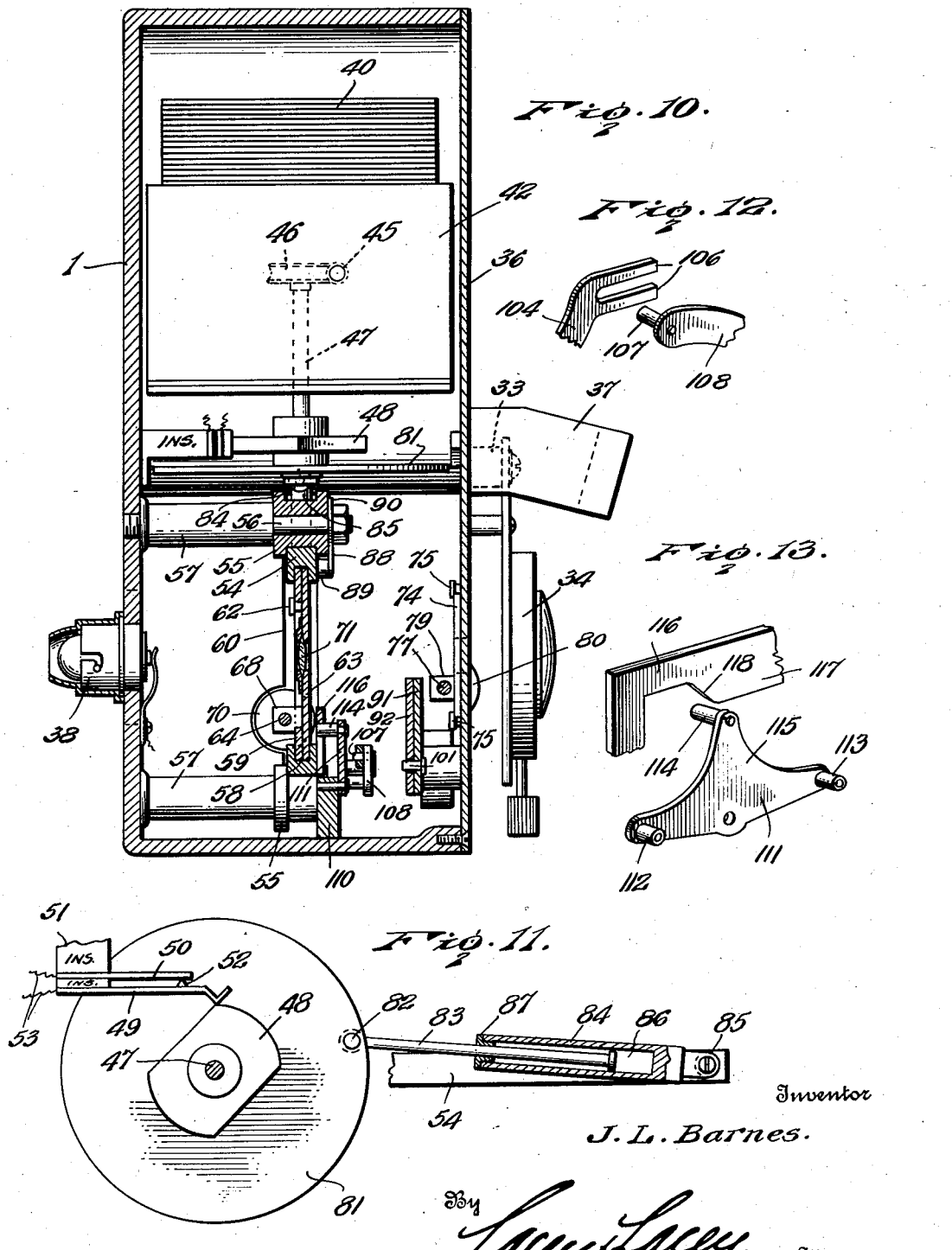

Patented June 11, 1940

2,204,291

UNITED STATES PATENT OFFICE 2,204,291

OPTICAL INSTRUMENT

James L. Barnes, Fostoria, Ohio

Application October 28, 1937, Serial No. 171,550

12 Claims. (Cl. 128—76.5)

This invention relates to an optical training instrument known as an optical instrument and more particularly relates to a mechanical device for training orthoptically the human eye or eyes and correcting the following departures from normal and effecting mechanical treatment set forth as follows:

Amblyopia, amblyopia anopsia, strabismus, hyperphoria, stimulating or retarding accommodation, stimulating or retarding convergence, to bring about a normal balance between accommodation and convergence, correction of optical squints, reduction of hyperopia or myopia (including astigmatic errors), relieving headaches due to refractive or orthoptic causes, relax accommodational lock or spasm, increasing visual occuity, to produce coordination between and within the optical nerve tracks, to build up optical functional reserves, to build and establish steriopsis, stimulate visual reaction, building visual fields, increasing sensitivity of macular area and field vision, stimulating activity and lessening time elapsing between stimulation and perception, building and balancing coordination of stimulation and perceptional reactions, balancing and building brain patterns, building and stimulating color perception and building achroma-topsia brain patterns (as in color blindness), mapping central scotoma, mapping color fields, mapping fields of vision, create a keener and speedier reaction on the nerve fibers and cells, motor, central, sensory, sympathetic and mixed.

The above is accomplished by new and improved scientific principles and technics of stimulating the natural functional nerve tract and nerve centers and by building unnatural nerve tracts at option when the natural paths are destroyed and by developing the motor centers and nerve paths or tracts, visual fields and central areas. The principles are carried out by mechanical mechanism consisting briefly of a sighting device including power lenses for gathering reflected light and bringing it to a focal point on the macular area of the retina or retina fields of the eye only for a concentrated reflex stimulation through the optic nerve to the motor centers in the brain, which being stimulated by this reflex stimulation send out stronger impulses over the motor and sensory nerve system stimulating the visual action when the slidable carrier holding the lenses moves to a position disposing the lenses opposite openings in the sighting device so that the patient may view a target mounted on a target holder carried by the base of the instrument or carried by a distant target holder placed from ten to twenty feet distant from the instrument, means being provided for intermittently illuminating the target and automatically operating means being provided for interrupting the patient's view of the lenses.

One object of the invention is to provide an optical training instrument wherein a lens carrier may be moved into and out of position to dispose power lenses carried thereby opposite sight openings through which a patient looks into a housing in which the lens carrier is mounted, the lens carrier being automatically operated and shifted to alternately move the lenses into and out of position opposite the sight openings.

It is another object of the invention to so mount the lenses in the carrier that they may be adjusted according to the distance between a person's eyes and thus conform to the requirements of the patient being treated.

Another object of the invention is to provide shutters which may be adjusted to conform to the spacing of the lenses and in addition provide improved means for automatically imparting movement to the shutters and shift the shutters into and out of position between the sight openings and the power lens carriers. Movement of the shutter into its blocking or operative position interrupts the view so that the patient is not distracted by movement of the power lens carrier. It will thus be seen that the eye will be at rest during movements of the lens carrier and receive the motor stimulation sent out by the brain and react properly and not be impaired in its action by other stimulations not controlled by the instrument as would be the case if the attention of the patient were distracted by movements of the shutter and mixed impulses created instead of a single brain impulse stimulation.

Another object of the invention is to provide improved means for controlling illumination of the target and cause turning on and off of a lamp for illuminating the target to be accomplished in proper timed relation to movements of the shutters and the lens carrier.

Another object of the invention is to provide a device of this character wherein all of the moving parts are actuated from a single electric motor, thus assuring movement of the various parts in correct timed relation to each other.

Another object of the invention is to provide an optical training instrument of the character set forth requiring a minimum number of treatments in order to accomplish the desired result and also reducing to a minimum the length of time for each treatment.

Another object of the invention is to provide an instrument of this character which can be very easily operated by trained operators and also of such construction that only a short period of time will be required for the operator to learn the proper operation.

The invention is illustrated in the accompanying drawings, wherein

Figure 2:
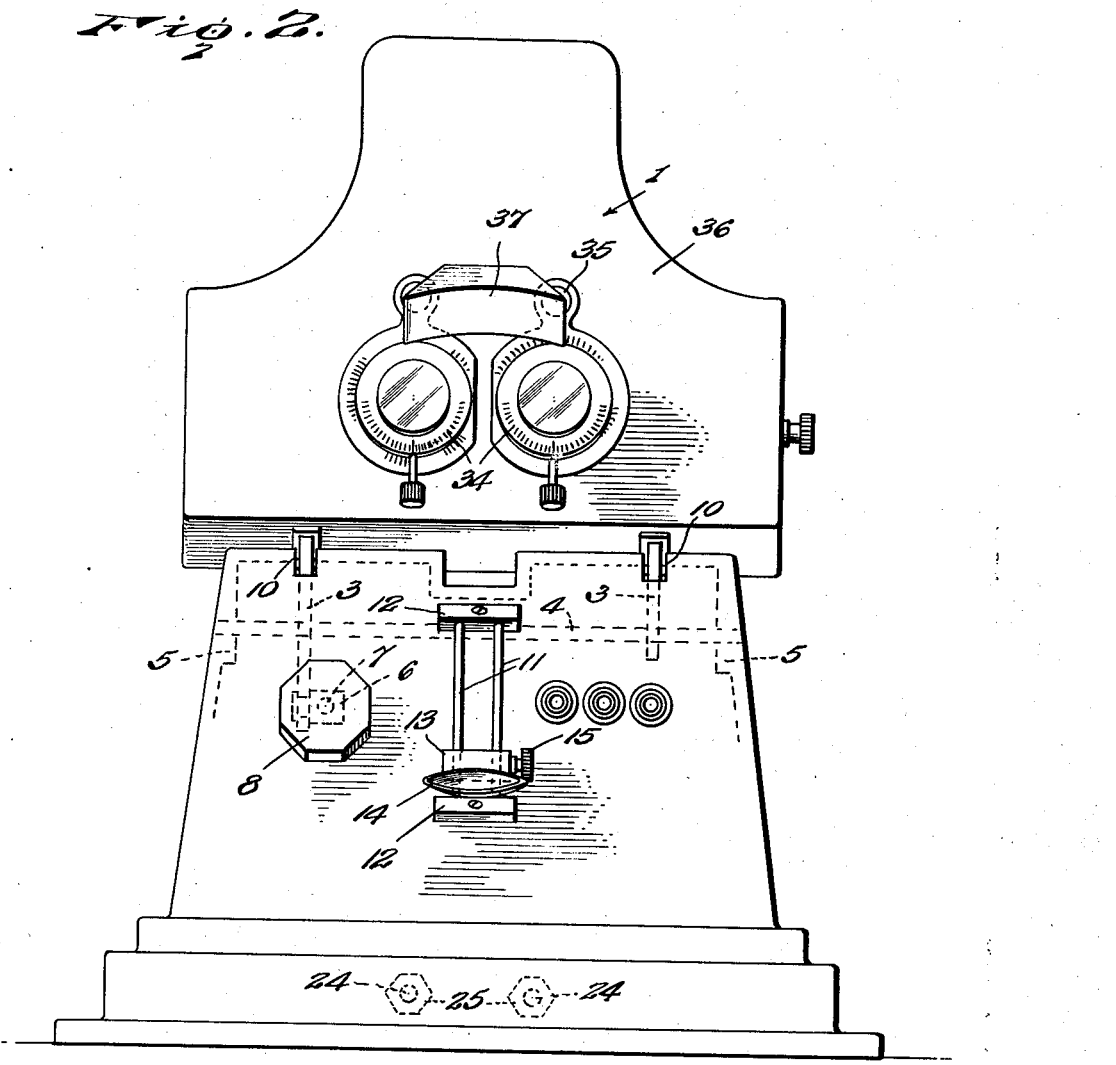
Figure 5:
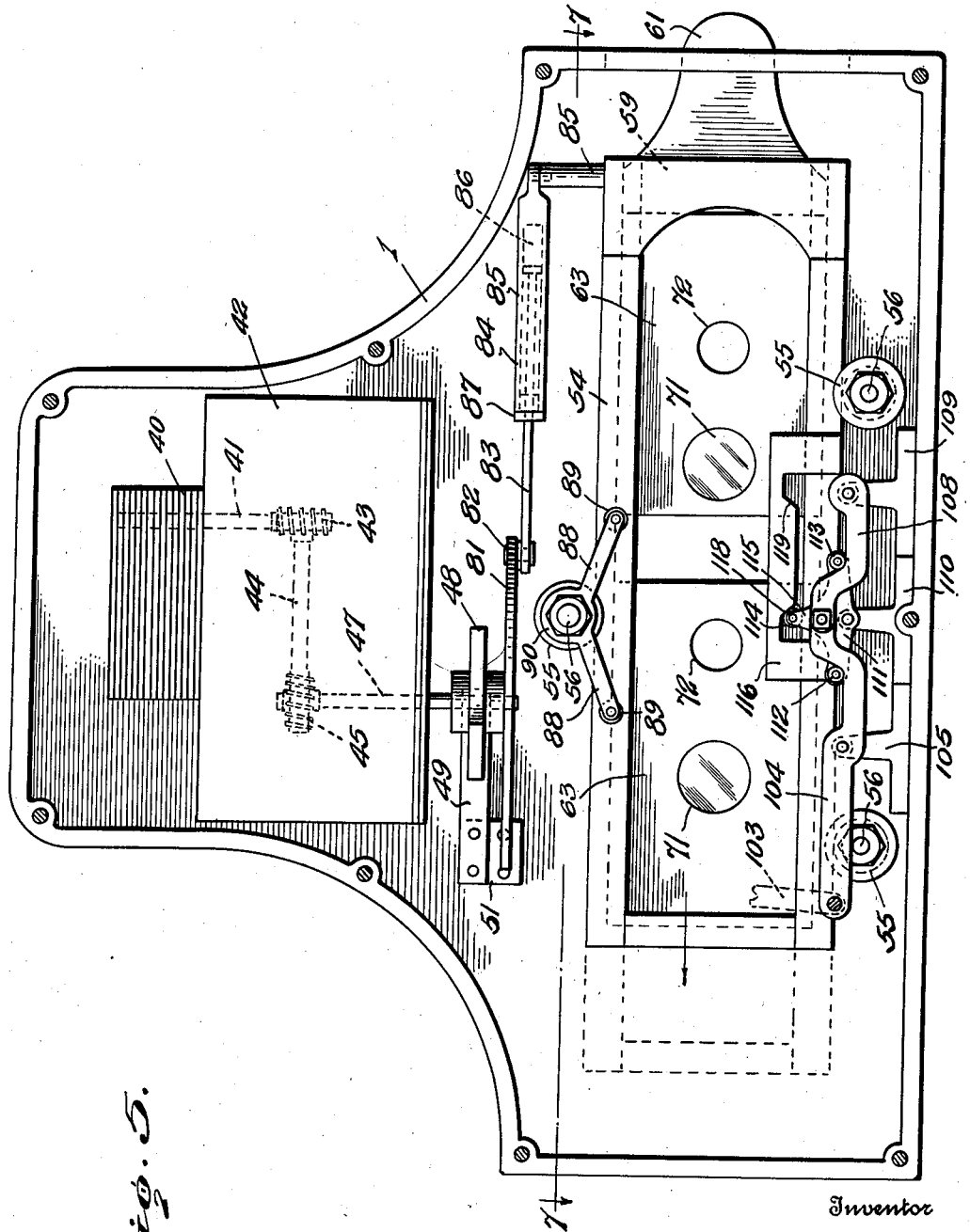

Figure 1 is a view showing the improved optical training instrument in side elevation with a portion of its base or standard in vertical section, Figure 2 is a front elevation of the optical training instrument, Figure 3 is a sectional view taken along the line 3—3 of Figure 1, Figure 4 is a fragmentary view in elevation looking at the lower portion of the rear wall of the main housing or casing of the device, Figure 5 is a view in elevation looking at the main housing or casing from the front with the front wall and mechanism carried thereby removed, Figure 6 is a view looking at the inner face of the front wall and showing the mechanism carried thereby, Figure 7 is a sectional view taken transversely through the main housing along the line 7—7 of Figure 5, Figure 8 is a view in elevation of the lens carrier, Figure 9 is a sectional view taken along the line 9—9 of Figure 8, Figure 10 is a sectional view taken vertically through the main housing or casing, Figure 11 is a fragmentary view illustrating in detail a portion of the operating mechanism, Figure 12 is a fragmentary view illustrating the manner in which arms forming part of the operating mechanism are inter-engaged with each other, Figure 13 is a perspective view of a rocker arm and a portion of a cam bar for imparting rocking movement to the rocker arm.

Figure 14 is a diagrammatic view showing a power lens making a point focus stimulation where a retinal image is not formed, and Figure 15 is a diagrammatic view showing a power lens with the rays of light crossing for forming a retinal image.

This improved optical training instrument has a main housing or casing 1 disposed over a hollow base 2, and upon referring to Figures 1 and 2, it will be seen that the housing is secured upon upper ends of arms 3 which are carried by a shaft 4 journaled in bearings 5 formed near the upper ends of the end walls of the base. One of the arms 3 is of greater length than the other and extends downwardly below the shaft and carries an internally threaded sleeve 6 which is swiveled to a side of the lower end portion of this arm and receive the threaded stem 7 carried by a turning knob 8, the shank 9 of which is rotatably mounted through the front wall of the base. By turning the knob 8 rocking movement may be imparted to the arm carrying the sleeve 6 and the shaft 4 will be turned and the two arms swung through slots 10 formed in the top of the base and effect tilting adjustment of the housing 1. It will thus be seen that the housing may be swung to a position which will be most convenient for the patient being treated and remain in the angularly adjusted position. Rods 11 which are carried by upper and lower cross-heads 12 are disposed vertically in front of the base with the cross-heads secured against the front wall thereof, and these rods extend through openings formed in a cross bar 13 carrying a chin rest 14 in the form of a shallow cup formed of any desired material. A set screw 15 is threaded through one end of the cross bar 13 for engaging one of the rods 11 and securely but releasably holding the chin rest in a vertically adjusted position. It will thus be seen that the chin rest may be shifted vertically to a position in which a patient's chin may conveniently rest thereon and support the person's head during use of the instrument.

A chart is to be used in connection with the instrument, and in order to support the chart, there has been provided a chart-holding plate 16 having clips 17, by means of which the chart may be securely but detachably held against the plate and serve as a target. Any suitable characters may be printed or otherwise provided upon the chart. A hinge lug 18 extends rearwardly from the lower portion of the plate 16 and is pivoted to a companion hinge member or block 19 mounted at the upper ends of rods 20 which extend downwardly from ends of the block 19 and are slidably received in tubular posts or sleeves 21 rising from rear ends of arms 22. A set screw 23 is carried by each post 21 for engaging the rod received therein and securely but releasably holding the rod stationary after vertical adjustment thereof. It will thus be seen that the chart-holding plate may be vertically adjusted to a correct position and the set screws then tightened to hold it at the desired height. The arms 22 are pivoted by pins 22' to a block 23 which is slidably carried by rods 24 serving as a track for the block and having their forward end portions screwed into threaded sockets formed in the lower portion of the base and firmly secured by locking nuts 25. A bolster 26 having bearings or sockets 27 to receive rear ends of the rods 24 serves as a support for rear ends of these rods and adjacent its ends is formed with openings through which the securing screws 28 may be passed to firmly secure the bolster in place upon a table upon which the instrument is placed when in use. By having the arms 22 carried by a block 23 which is slidable along the rods 24, the chart-holding plate or disk may be shifted towards or away from the base 1 and the housing 2 and a chart carried by the plate disposed at the proper focal distance from the housing. A lug or short post 29 extends upwardly from the block between the arms and carries a disk 30 which is rotatably mounted through the medium of a screw 31 serving not only as means for rotatably mounting the disk but also as means for securing the post or lug 29 to the block 23. Arcuate slots 32 are formed in the disk 30 eccentric thereto, as shown in Figure 3, and into these slots engage pins 33 rising from forward ends of the arms 22. When the disk is turned about the fastener 31, swinging movement in opposite directions will be imparted to the arms 22 and the posts shifted towards or away from each other according to the direction in which the disk is turned. When a chart holder of the type shown and described is in use, the arms 22 remain in the spaced parallel relation to each other shown in Figure 2 and the chart holder will be held against transverse movement out of centered relation to the housing 1 but can be shifted towards and away from the housing along the rods 24. Transverse adjustment of the posts is only employed in the training of field or perrificcial visual fields, in which case the chart holder having the two pins 20 is removed and two small chart holders used, each of which has a single depending pin engaged in one of the posts 21. The disk can then be turned to swing the arms 22 about the pivots 22' so that the small chart holders are gradually spread by this transverse adjustment while the patient's attention is directed at a distant chart or target, the two small targets still remaining in a position of indirect vision while training is being given. This widens the individual visual angle enabling a patient to see objects at a greater side angle as is very desirable when driving an automobile and another car approaches from a side street or highway, or the automobile approaches a railroad crossing.

During use of the instrument, the patient looks through the housing 1 towards the chart-holding disk and in doing so may look through rotary prisms 34 which are only used for muscular training work and other functional training during which both eyes are trained at the same time. With many of the trainings given with this instrument the prisms are not used and, therefore, the prisms are pivotally suspended from posts 35 carried by the front plate 36 at opposite sides of a forehead rest 37 which projects forwardly above the prisms, as shown clearly in Figures 1 and 2. By so mounting the prisms they may be swung about the pivots 35 into and out of position for use and also adjusted to accommodate them to the width of space between a person's eyes. In view of the fact that the patient has his forehead resting against the forehead rest 37 and his chin resting upon the chin support 14, his head will be held in its proper position and he can look steadily through sight openings in the front wall of the housing or through the prisms which will be swung about the posts 35 until they are properly spaced to accommodate themselves to the distance between the patient's eyes. Lighting of the chart is accomplished through the medium of a lamp 38 extending outwardly from the rear wall of the housing 1 between sighting openings 39, and this lamp 38 will be caused to emit a flashing light by being intermittently energized in a manner to be hereinafter set forth.

The mechanism for training the eyes and correcting the various ailments previously set forth is mounted within the housing 1 and is operated through the medium of an electric motor 40 which is mounted in the upper portion of the housing, as shown in Figures 5 and 10, and has a motor shaft 41 extending downwardly into a transmission casing 42. At its lower end the motor shaft carries a worm 43 meshing with a worm gear carried by a transmission shaft 44, and this shaft carries at its opposite end a worm 45 meshing with a worm gear 46 at the upper end of a driven shaft 47 which extends downwardly from the transmission casing through the bottom thereof. A suitable shelf or bracket may be provided for supporting the transmission casing and the electric motor in the housing. In the preferred embodiment of the invention, the motor shaft rotates at the rate of 3,600 revolutions per minute and in transmitting rotary motion from this shaft to the shaft 44 the speed of rotation is cut down by the worm 43 and the worm gear with which it meshes so that the shaft 44 turns at a speed of 360 revolutions per minute. The worm and gear connection between the shaft 44 and the shaft 47 cuts down the speed of rotation to such a point that the shaft 47 turns at the rate of 20 revolutions per minute. It will thus be seen that the shaft 47 turns at a relatively slow rate of speed. It is to be understood that any desired speed ratios may be provided between the speed at which the motor shaft turns and the speed at which the driven shaft 47 is turned. Adjacent its lower end the driven shaft carries collars between which a cam disk 48 formed of fiber or other suitable material is mounted. This cam disk has opposed flat side faces and opposed arcuate edge faces, as shown in Figure 11, and has contacting engagement with the movable arm 49 which together with the stationary arm 50 forms a switch carried by a bracket 51 of insulated material. The switch arm 49 is normally out of engagement with the stationary arm 50, but when its free end is in engagement with the arcuate edge faces of the cam disk 48, it will be shifted towards the stationary arm 50 and its contact point 52 moved into engagement with the arm 50. The wires 53 leading from the contact arm or switch arm form part of the circuit for the light 38 and as the circuit will be intermittently closed a flashing light will be produced and the chart upon the chart-holding disk intermittently illuminated.

Within the housing 1 is mounted a frame 54 which is slidably mounted between upper and lower grooved rollers 55 rotatably mounted upon the spindles 56 of posts 57 carried by the rear wall of the housing. The frame is open at one end and is internally grooved, as shown at 58, to receive a lens-carrying plate or auxiliary frame 59 which is slid into and out of the frame 54 through a slot 60 formed in a side wall of the housing and has a reduced end 61 constituting a finger-engaging tongue, by means of which the auxiliary frame may be grasped and easily inserted or removed from the frame 54. The auxiliary frame 59 has its intermediate portion cut out, as shown in Figures 8 and 9, and through this cut out portion extend headed pins 62 carried by plates 63. These plates are shiftable longitudinally of the auxiliary frame, and in order to adjust their positions relative to the auxiliary frame, there has been provided a stem or shaft 64 rotatably mounted through a bearing 65 and having its inner end portion formed with oppositely threaded portions 66 and 67 engaged through the correspondingly threaded bearing sleeves 68 and 69 carried by the plates 63. A turning head 70 is provided at the outer end of the stem or rod 64, and from an inspection of Figure 8, it will be readily understood that, when the stem is turned, the plates 63 will be shifted toward or away from each other according to the direction in which the stem is turned. Power lenses 71 are carried by the plates 63 in operative relation to openings formed therein, and these plates are also formed with openings 72 spaced from the lenses longitudinally of the plate. The power lens is made from very high quality optical glass ground on such optical plus curves to suit the distance it is set in the instrument from the eyes to bring about the gathering of light in such a way that the rays of light strike the cornea of the eye on such convergent angles that they strike the retina at the exact focal point, not forming an image on the retina but just a focal point of light as shown in the drawings. Point focus is the point where the rays of light cross before they start divergent angle to create an optical image, as shown in the drawings. Drawing #1 shows power lens making a point focus stimulation and does not create a retinal image as the rays of light do not cross, while in drawing #2, the rays of light cross, forming a retinal image which image reflex is transmitted to the brain over the optical nerve system. While the point focus strikes the retina, no image is formed so that no image reflexes reach the brain but, instead, as the point focus of light rays strike the retina on the macular area, causes a strong nerve reflex to be sent to the brain, but this reflex does not fit into any type of brain pattern, thus causing the brain to send out stronger stimuli than on ordinary image impulses. To try to make this more clear, I will try to explain the process of image vision. For an eye to transmit an image impulse to the brain the following process has to take place:

1. When light strikes the retina, a light reflex is sent to the brain over the optical nerves.

2. The brain receiving light impulses then sends out brain stimulations to the muscles of the eye to accommodate and converge, or diverge to bring about a focal image on the retina.

3. When the muscles of the eye receive the brain stimulation to bring about a focal image, the accommodation acts and brings about a focal image which then reflex the image stimulation to the brain, where it is recorded in a brain pattern.

With the above visual process in mind, it will be readily seen that the eye is not enervated by any chart or objects; that it is enervated by light stimuli. This brings us to the power lens which, when passed before the eye, creates a strong light stimulae and cannot bring about the formation of an image on the retina. So, during the time it is in front of the eye, a strong continuous light stimulus is being received by the brain and the remaining visual action is retarded until after the power lens is removed from the eye, allowing during this time for generation of strong reserve nerve energy in the brain which, when the power lens is removed, the brain sends out a much stronger brain stimuli to bring about the remaining visual action when the alignment of the targets or objects at either near or distance through the sighting units to make a satisfactory test on the power lens reaction. Take a +18.00 Diopter sphere lens from any ordinary trial case. Close the left eye, in either daylight or artificial light, holding the said lens at about two inches in front of the right eye directly vertical in front of the right eye and then gradually pass it vertically over the right eye completely across the eye, both up and down, so as to allow the eye to look at a distant or near object. The light focus from the +18.00 lens must pass directly over the pupil of the eye. Pass this lens across the eye from twenty-five to fifty times, at the rhythm or speed of a clock pendulum, and you will easily feel the effects of the power lens stimuli. The +18.00 lens will come near to the proper effect at two inches in front of the eye. While this power lens has to be figured out very positively in fractions and diopters to obtain the exact focus for the instrument so that the exact focal point strikes the macula area.

This action of the power lens builds up the nerve energy reserves and accelerates the nerve reflexes and muscular response much like a steam engine is governed by the steam pressure in the boiler. Thus the nerve reserve (nerve pressure) governs the functions of visual reflexes. As the reserve is built up in training, the visual muscles and nerves become healthier and function becomes normal. The effects of the power lens are hard to put in lay language other than to say that it builds up the nerve energy reserve, builds coordination, stimulates less or inactive nerve fibers, in other words, readjusts the complete visual functional order as a mechanic would tune up an auto engine, by rebuilding, strengthening, adjusting and coordinating functions to the normal functions. By properly adjusting the plates the power lenses 71 may be spaced from each other a distance corresponding to the space between the eyes of a patient to be treated and the openings 72 will be correspondingly spaced from each other. Therefore, the patient will be able to see properly through the openings 72 which will be in alinement with the openings 39 and the power lenses will be spaced from each other a distance corresponding to the distance between the patient's eyes and properly disposed for gathering reflected light and bringing it to a focal point on the macular area of the retina or retina fields of the eye for a concentrated reflex stimulation through the optic nerve to the motor centers in the brain, which being stimulated by this reflex stimulation send out stronger impulses over the motor and sensory nerve system for stimulating the visual action. The patient also looks through openings 73 formed in plates 74 slidably supported against the front plate or wall 36 by headed pins 75. Slots 76 which are elongated transversely of the front plate are formed through the same, and from an inspection of Figure 6, it will be readily appreciated that by providing the front plate or wall 36 with these slots the plates 74 and the prisms can be accurately alined with each other to correspond to the distance between a person's eyes. Adjustment of the plates towards and away from each other is obtained through the medium of a threaded rod or stem 77 which is journaled through a bearing 78 and has its oppositely threaded portion engaged through correspondingly threaded sleeves 79 carried by the plate so that, when the rod or stem is turned through the medium of its turning head 80, the plates will be shifted towards or away from each other according to the direction in which the stem is turned.

The frame 54 together with the auxiliary lens-carrying frame or plate 59 is to be slid back and forth to alternately move the lenses 71 and the openings 72 into position between the sighting openings 39 and 73, and in order to do so, there has been provided reciprocating mechanism illustrated in Figure 5. Referring to this figure, it will be seen that a disk 81 is fixed to the lower end of the shaft 47 and adjacent its periphery the disk 81 carries a pin 82 which extends downwardly therefrom and loosely carries one end of a pitman rod 83. This pitman rod is slidably received in a cylinder or tubular arm 84 pivoted to the upper end of a post 85 rising from one end of the frame 54, and at its inner end the pitman rod is provided with an enlargement or head 86, outward movement of which is limited by engagement with a plug or bushing 87 which is mounted in the free end of the sleeve, as shown in Figure 11. From an inspection of Figures 5 and 11, it will be readily understood that during rotation of the disk 81 reciprocating motion will be imparted to the frame 54 by push and pull exerted through the medium of the pitman rod 83, but since the enlarged end or head 86 of the pitman rod must move from one end of the sleeve 84 to the other before reverse movement may be imparted to the frame, there will be intervals of time in which the frame will remain stationary after being shifted its full extent in one direction and before it starts its return movement. A brake is provided in order to prevent movement of the frame with the pitman rod during the time the enlargement or head 86 is moving from one end of the sleeve to the other and consists of resilient arms or spring strips 88 carrying pads 89 at their free ends. These arms or resilient strips are formed integral with a hub or disk 90 which fits about the spindle carrying the upper roller 55, and since the pads or shoes 89 are held in position to frictionally grip the upper portion of the frame 54 by the resiliency of the arms, movement of the frame will be prevented until the enlarged end portion 86 of the pitman rod has positive engagement with the plug 87 or the inner end of the sleeve 84. In view of the fact that the frame 54 receives its reciprocating movement from the shaft 47 carrying the cam disk 48 which opens and closes the switch for the light 38 movement of the frame and flashing of the light will be accomplished in proper synchronized relation to each other.

The patient's view through the housing should be shut off during movement of the frame and the lenses carried thereby from one position of adjustment to another. In order to do so, there have been provided shutters 91 and 92 having shanks 93 and 94 which are fulcrumed, as shown at 95 and 96, and carry weights 97 and 98 serving as counterbalances to permit the shutters to be easily swung upwardly from the lowered position, indicated by full lines in Figure 6 to the operative position shown by dotted lines in this figure. A bumper 99 is provided for engagement by the weight 98 so that downward movement of the shutters to the inoperative position will be limited. These shutters are to move together, and in order to do so, the shutter 91 has been formed with a slot 100 in which engages a pin 101 projecting from a side face of the free end portion of the shutter 92. It will thus be seen that, when the shutter 92 is swung upwardly to the operative position, it will carry the shutter 91 with it and the two shutters will be disposed in position across the openings 73 and a person's view through these openings 73 and through the lenses 71 or openings 72 will be cut off. A lever 102 is fixed to the fulcrum 96 to turn the same and swing the shutter to the raised or operative position, and in order to actuate this lever, there has been provided a link 103.

The shutters are to have their movement synchronized with movement of the lens-carrying frame 54, and in order to do so, there has been provided actuating mechanism for the shutters operated during movement of the lens-carrying frame. Referring to Figure 5, it will be seen that the link 103 has its lower end pivoted to the outer end of a relatively long lever 104 which is pivoted to a bracket 105 secured to the bottom of the housing. The inner end of the lever 104 is slotted to form fingers 106, between which engages a pin 107 extending laterally from the inner end of a relatively short rocker arm or lever 108 pivoted to a bracket 109 also secured upon the bottom of the housing. Between the brackets 105 and 109 is secured a bracket 110 to which is pivoted a cross arm 111 which may be referred to as a bell crank lever. This bell crank lever which is of double formation carries pins 112 and 113 at its ends which overlap the levers 104 and 108. A pin 114 extends from the upwardly extending arm 115 of the bell crank lever towards the lens-carrying frame and projects through a cam frame 116 carried by and extending longitudinally of the lower bar of the lens-carrying frame, as shown clearly in Figure 5. Referring to this figure and also to Figure 13, it will be seen that the cam frame 116 is formed with a longitudinally extending tongue or strip 117 having oppositely sloping end edges 118 and 119 which are adapted to engage the pin 114 as the cam frame moves with the lens-carrying frame and impart tilting movement to the bell crank lever. When the bell crank lever is moved towards the left in Figure 5, the pin 112 will exert pressure upon the inner end portion of the longer lever 104 and tilt this lever about its fulcrum and thus exert upward pressure upon the link 103 and the lever 102 will be swung upwardly. The shutter 92 will be swung upwardly with the lever 102 and carry the shutter 91 upwardly with it until both are in position to extend across the sight openings and cut off view through the frame. As the lens-carrying frame moves toward the left a sufficient distance for the pin 114 to move along the sloping edge 119 to a position near the right-hand end of the cam frame, the shutters will return to the opened or lowered position and the patient can have an unobstructed view through the sight openings. Upon movement of the lens-carrying frame towards the right, the sloping edge 119 will act upon the pin 114 to swing the bell crank lever towards the right and the finger or pin 113 will depress the lever 108 and as the pin 107 of this lever is engaged between the fingers 106 of the lever 104 the lever 104 will be again swung about its fulcrum to exert upward pressure upon the link 103 and the shutters will be again moved to a closed or raised position where they will be held until the lens-carrying frame and the cam frame have moved toward the right to a position in which the pin 114 may move along the sloping edge 118 and return to the position near the left-hand end of the cam frame. The shutters will then again move to the lowered or opened position. It will thus be seen that the shutters will be open when the lens-carrying frame is stationary during movement of the enlargement or head 86 of the pitman rod 83 from one end of the sleeve 84 to the other but that during movement of the lens-carrying frame from the position shown in full lines in Figure 5 to the position indicated by dotted lines or back again to the full line position, the shutters will be moved to the closed position and shut off view of the patient. Therefore, there will be an interval during which the patient will be prevented from looking through the housing, and during this interval the lenses 71 or the openings 72 will be moved into position for the patient to see through them. The light 38 will also be extinguished during movement of the lens-carrying frame. The fact that the patient first looks through lenses 71 and then through the openings 72 and also the fact that the light is extinguished during this movement of the lens-carrying frame causes muscular action to take place and the pupils to be dilated or contracted according to whether or not the light is turned on and whether or not the patient is looking through lenses or through openings. The sudden contraction or expansion of the pupils causes blood simulant as well as forcing the muscles of accommodation to relax or function to impart the desired expansion or contraction of the pupil. It will thus be seen that the eye muscles will be exercised and also the nerves stimulated. This exercising of the nerves and muscles of the eye is very desirable in training the eyes to overcome amblyopia, and amblyopia exanopia and other eye defects.

Having thus described the invention, what is claimed as new is:

1. In an optical training instrument, a target holder, a sighting unit including lenses mounted for movement into and out of an operative position, means carried by the sighting unit for illuminating a target carried by the target holder, and means for intermittently shifting the lenses into and out of the operative position and extinguishing the illuminating means in synchronized relation to movements of the lenses.

2. In an optical training instrument, a target holder, a sighting unit including lenses mounted for movement into and out of an operative position, means carried by the sighting unit for illuminating a target carried by the target holder, means for intermittently shifting the lenses into and out of the operative position and extinguishing the illuminating means in synchronized relation to movements of the lenses, shutters movable into and out of position to shut off view through the sighting unit, and operating means for the shutters adapted to be actuated during movements of the lenses.

3. In an optical training instrument, a target holder, a sighting unit including rotatably adjustable prisms shiftable into and out of position for use, an electric lamp carried by the sighting unit for illuminating target carried by said holder, a lens holder movably mounted for shifting lenses into and out of position between the prisms and the target holder, means for intermittently moving the lens holder and turning the electric lamp on and off in timed relation to movements of the lens holder, shutters movable into and out of position between the prisms and the lens holder for shutting off view of the lens holder during movements thereof, and operating means for said shutters actuated by movements of the lens holder.

4. In an optical training device, a target holder, a sighting unit including adjustable prisms movable into and out of position for viewing a target carried by said holder, a lens carrier movably mounted for shifting lenses into and out of operative relation to the prisms, shutter movable into and out of position between the prisms and the lens carrier, illuminating means for the target holder, means for imparting movement to said lens holder and intermittently shutting off the illuminating means in synchronized relation to each other, and means for actuating said shutters in synchronized relation to movements of the lens carrier.

5. In an optical training instrument, a base, a target, a sighting unit carried by said base in operative relation to the target and comprising a housing having front and rear sight openings, a lens carrier shiftable through the housing between the front and rear sight openings, an electric lamp for illuminating said target carried by said housing, a switch for said lamp mounted in said housing, means for intermittently imparting shifting movement to the lens holder and opening and closing the switch to turn the lamp on and off in timed relation to movement of the lens holder, shutters mounted in said housing and movable into and out of position to extend across the sight openings at the front of the housing, and means for effecting movement of the shutters in timed relation to movement of the lens carrier.

6. In an optical training instrument, a target, and a sighting unit mounted in operative relation to said target, said sighting unit comprising a housing having front and rear walls formed with sight openings whereby the target may be viewed through the housing, an electric lamp for illuminating said target carried by said housing, a switch for said lamp in said housing, a lens-carrying frame mounted for reciprocating movement in the housing for moving lenses carried thereby into and out of position between the sight openings of the front and rear walls of the housing, a power unit in said housing including a driven shaft, a pitman connection between the driven shaft and lens-carrying frame consisting of a sleeve and a rod slidable in the sleeve between ends thereof and providing a lost-motion connection whereby shifting movement in either direction will be intermittently imparted to the lens-carrying frame, and a member carried by said shaft for engaging the switch as the shaft turns and effecting opening and closing of the switch to turn the illuminating lamp on and off in timed relation to movements of the lens-carrying frame.

7. In an optical training instrument, a target, and a sighting unit mounted in operative relation to said target, said sighting unit comprising a housing having sight openings in its front and rear walls, a lens-carrying frame slidably mounted in said housing for reciprocating movement transversely of the housing between the front and rear walls, an electric lamp carried by said housing for illuminating the target, a switch for said lamp, means for imparting reciprocating movement to said lens carrier and actuating the switch to turn the lamp on and off in timed relation to movement of the lens carrier, shutters mounted in said housing between the front wall and the lens-carrying frame, a cam member carried by said lens carrier, and operating means for said shutters actuated by movement of the lens carrier and adapted to move the shutters into position across the sight openings in the front wall of the housing during movement of the lens carrier in either direction.

8. In an optical training instrument, a target, and a sighting unit mounted in operative relation to the target, said sighting instrument comprising a housing having front and rear walls formed with sight openings, a lens-carrying frame in said housing mounted for reciprocating movement therein transversely of the housing between the front and rear walls for moving lenses held by the lens carrier into and out of an operative position between the sight openings of the front and rear walls, shutters pivotally mounted in the housing for movement into and out of position across the sight openings in the front wall, and actuating means for said shutters including lever arms pivotally mounted and having end portions inter-engaged for effecting simultaneous movement of the lever arms, an actuating lever engaging both lever arms, and a cam carried by said lens carrier for imparting movement to the actuating lever during movement of the lens carrier in either direction and imparting movement to the lever arms to swing the shutters to an operative position across the sight openings of the front wall during movement of the lens carrier.

9. In an optical training instrument, a target, and a sighting unit mounted in operative relation to the target and comprising a housing having front and rear walls formed with aligned sight openings through which a view of the target may be obtained by a person looking through the sight openings of the front wall, a lens carrier in said housing between the front and rear walls mounted for reciprocating movement, lost motion means for intermittently imparting reciprocating movement to the lens carrier, shutters for blocking the front sight openings carried by the front wall and movable into and out of an operative position across the front sight openings, operating means for said shutters mounted in said housing and operatively connected with the shutters, and means carried by the lens carrier for actuating the operating means for the shutters during movement of the lens carrier and moving the shutters to the operative position across the front sight openings.

10. In an optical training instrument, a target, and a sighting unit mounted in operative relation to said target and comprising a housing having front and rear walls formed with aligned sight openings through which a person may observe the target, a lens carrier in said housing between the front and rear walls mounted for reciprocating movement transversely in the housing, lost motion means for intermittently imparting reciprocating movement to the lens carrier and effecting stoppage of its movement at the extremity of its path of travel in either direction, shutters pivoted to the front wall for movement into and out of an operative position across the sight openings of the front wall in blocking relation thereto, said shutters being inter-connected for simultaneous movement thereof, a lever carried by one shutter, a link pivoted at one end to said lever, lever arms pivotally mounted in the housing between the lens carrier and the front wall and having their inner ends inter-connected for simultaneous movement of the lever arms, the outer end of one lever arm being pivoted to said link for shifting the link upwardly and imparting movement to said lever to swing the shutters upwardly into blocking relation to the front sight openings when inner end portions of the lever arms are swung downwardly, a bell crank lever pivotally mounted in the housing and having pins overlying inner end portions of the lever arms, a cam member carried by said lens carrier, and a pin extending from the upper portion of the bell crank lever in position for engagement by the cam member during sliding movement of the lens carrier in either direction whereby the shutters will be held in an operative position during movement of the lens carrier.

11. In an optical training instrument, a target, and a sighting instrument comprising a housing having front and rear walls formed with sight openings, prisms mounted in front of the front wall and adjustable to accommodate themselves to a patient's eye, said prisms being movable into and out of position for use, plates adjustably carried by the front wall and having adjusting means whereby the plates may be shifted toward and away from each other to move openings in the plates into alinement with said prisms, a lens carrier in said housing between the front and rear walls mounted for reciprocating movement transversely of the housing, lens holders carried by said lens carrier and having means for shifting the lens holders toward and away from each other into position to dispose lenses in alinement with the prisms and the openings in said plates, shutters pivotally mounted between the front wall and the lens carrier for movement into and out of an operative position across the path of vision between the lenses and the prisms, and operating means for said shutters including an actuating member carried by the lens carrier and adapted to effect movement of the shutters to an operative position and retain the shutters in the operative position during movement of the lens carrier.

12. In an optical training instrument, a base, tracks extending from said base, a block slidable along said track towards and away from the base, arms pivoted to said block, posts rising from said arms, stems in telescoping engagement with said posts, a target holder carried by said stem, a disk rotatably mounted over said block and formed with slots eccentric to the disk, pins extending from said arms into said slot for effecting angular adjustment of the arms and target holder when the disk is turned, and a sighting unit carried by said base in operative relation to the target holder and provided with means for stimulating the nerves and muscles of the eyes of a person looking through the sighting unit towards the target, said sighting unit including power lenses.

JAMES L. BARNES.